US011231635B2

(12) United States Patent
Moon et al.

(10) Patent No.: US 11,231,635 B2
(45) Date of Patent: Jan. 25, 2022

(54) ELECTRICALLY-CONTROLLABLE 3D OPTICAL WAVEGUIDE SWITCH WITH PHASE CHANGE MATERIALS

(71) Applicant: HRL Laboratories, LLC, Malibu, CA (US)

(72) Inventors: Jeong-Sun Moon, Moorpark, CA (US); Ryan G. Quarfoth, Los Angeles, CA (US); Kangmu Lee, Playa Vista, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 16/951,518

(22) Filed: Nov. 18, 2020

(65) Prior Publication Data

US 2021/0149271 A1    May 20, 2021

Related U.S. Application Data

(60) Provisional application No. 62/937,470, filed on Nov. 19, 2019.

(51) Int. Cl.
*G02F 1/313* (2006.01)
*G02B 6/35* (2006.01)
*G02F 1/295* (2006.01)

(52) U.S. Cl.
CPC ......... *G02F 1/3137* (2013.01); *G02B 6/3544* (2013.01); *G02F 1/295* (2013.01); *G02F 1/313* (2013.01); *G02F 1/3132* (2013.01); *G02F 2202/10* (2013.01)

(58) Field of Classification Search
None
See application file for complete search history.

(56) References Cited

U.S. PATENT DOCUMENTS

| | | | |
|---|---|---|---|
| 7,728,319 B2 | 6/2010 | Goux | |
| 9,368,720 B1 | 6/2016 | Moon | |
| 10,345,518 B1 | 7/2019 | Yap | |
| 2003/0053741 A1* | 3/2003 | Hoke | G02F 1/3132 385/17 |
| 2007/0058896 A1 | 3/2007 | Toyoda | |
| 2016/0056373 A1 | 2/2016 | Goktepeli | |

FOREIGN PATENT DOCUMENTS

| | | | |
|---|---|---|---|
| CN | 106324865 A | * | 1/2017 |
| JP | 2009-128718 A | * | 6/2009 |

OTHER PUBLICATIONS

From U.S. Appl. No. 14/528,945 (now U.S. Pat. No. 9,368,720), Notice of Allowance dated Feb. 16, 2016.
From U.S. Appl. No. 14/528,945 (now U.S. Pat. No. 9,368,720), office action dated Nov. 16, 2015.

(Continued)

*Primary Examiner* — Michael Stahl
(74) *Attorney, Agent, or Firm* — Ladas & Parry

(57) ABSTRACT

A vertical directional coupler or switch comprising a lower and an upper waveguide, integrated with an optical phase change material disposed between the lower and upper waveguides to control a directional of optical coupling between the lower and upper waveguides.

18 Claims, 10 Drawing Sheets

(56) References Cited

OTHER PUBLICATIONS

Biberman et al., "CMOS-Compatible Scalable Photonic Switch Architecture Using 3D-Integrated Deposited Silicon Materials for High-Performance Data Center Net-works", Proceedings 2011 Conference on Lasers and Electro-Optics paper OMM2 (3 page).
Botula, et al., "A Thin-film SOI 180 nm CMOS RF Switch Technology", Silicon Monolithic Integrated Circuits in RF Systems (SIRF), pp. 1-4, Jan. 2009.
Chua, "Low resistance, high dynamic range reconfigurable phase change switch for RF applications", Applied Physics Letters, vol. 97, 183506-1 to 183506-3, 2010.
EE Times, Nov. 29, 2011, "Samsung preps 8-Gbit phase-change memory", pp. 1-6, printed Oct. 30, 2014.
El-Hinnawy et al., "A Four-terminal inline, Chalcogenide phase-change RF switch using an independent resistive heater for thermal actuation", IEEE Electron Device Letters, vol. 34, No. 10, pp. 1313-1315, Oct. 2013.
Kelly, et al., "The State-of-the-art of Silicon-on-Sapphire CMOS RF switches", CSIC Digest, pp. 200-203, 2005.
Lo et al., "Three-terminal probe reconfigurable phase-change material switches", IEEE Transactions on Electron Devices., vol. 57, No. 1, pp. 312-320, Jan. 2010.
Makioka et al., "Super self-aligned GaAs RF switch IC with 0.25 dB extremely low insertion loss for mobile communications", IEEE Transactions Electron Devices, vol. 48, No. 8, pp. 1510-1514, Aug. 2001.
Moon et al., "High-linearity 1 ohm RF switches with phase-change materials", SIRF, pp. 7-9, Jan. 2014.
Moon, "Reconfigurable infrared spectral imaging with phase change materials," Proceedings of SPIE 10982, Micro- and Nanotechnology Sensors, Systems, and Applications XI, 109820X (May 13, 2019), 6 pages.
Perniola et al., "Electrical behavior of phase-change memory cells based on GeTe", IEEE Electron Device Letters, vol. 31, No. 5, pp. 488-490, May 2010.
Rebeiz et al., "Tuning in to RF MEMS" IEEE Microwave Magazine, pp. 55-72, Oct. 2009.
Shim, et al., "Non-linear analysis of RF ohmic switches based on phase-change materials", IEEE Electron Device Letters, vol. 35, No. 3, pp. 405-407, Mar. 2014.
Soref, et al., Electro-optical switching at 1550 nm using a two-state GeSe phase-change layer, Optics Express, vol. 23, No. 2, pp. 1536-1546, 2015.
Tomback et al., "Cellular Antenna Switches for Multimode Applications based on a Silicon-on-Insulator Technology", IEEE Radio Frequency Integrated Circuits Symposium (RFIC), pp. 271-274, May 2010.
Wen et al., "A phase-change via-reconfigurable on-chip inductor", IEDM Tech Digest, pp. 10.3.1-10.3.4, Dec. 2010.
Wong, et al., "Phase Change Memory", Proceedings of the IEEE, vol. 98, No. 12, Dec. 2010, pp. 2201-2227.
Zhang, et al., "Broadband nonvolatile photonic switching based on optical phase change materials: beyond the classical figure-of-merit," Optics Letters, vol. 43, No. 1, Jan. 2018, pp. 94-97.
PCT International Search Report and Written Opinion from PCT/US2020/061121 dated Mar. 11, 2021.
Aleksandr Biberman et al, Photonic network-on-chip architectures using multilayer deposited silicon materials for high-performance chip multiprocessors, ACM Journal on Emerging Technologies in Computing Systems, vol. 7, Issue 2, p. 7:1-7:25, Jul. 2011, [Retrieved: Feb. 10, 2021] from [https://doi.org/10.1145/1970406.1970409].
Peipeng Xu et al, Low-loss and broadband non-volatile phase-change directional coupler switches, ACS Photonics 2019, vol. 6, Issue 2, pp. 1-7, Nov. 6, 2018, [Retrieved: Feb. 10, 2021] from [https://arxiv.org/abs/1811.08490v1].

* cited by examiner

Thru-state

Cross-state

ELECTRICALLY-CONTROLLABLE 3D OPTICAL WAVEGUIDE SWITCH WITH PHASE CHANGE MATERIALS

CROSS REFERENCE TO RELATED PATENTS AND APPLICATIONS

This application claims the benefit of U.S. Provisional Patent Application No. 62/937,470 filed 19 Nov. 2019 and entitled "Electrically-controllable 3D optical waveguide switch modeling with phase change materials" the disclosure of which is hereby incorporated herein by reference.

The technology disclosed herein is related to that disclosed by U.S. Pat. No. 9,368,720 entitled "Method to make Phase-Change Material RF Switches with Thermal Dielectrics" which issued on 14 Jun. 2016, the disclosure of which is hereby incorporated herein by this reference.

STATEMENT REGARDING FEDERALLY SPONSORED RESEARCH OR DEVELOPMENT

None

TECHNICAL FIELD

The disclosed technology relates to optical switches.

BACKGROUND

Modern microelectronics applications in defense and commercial areas are expanding toward cognitive RF and image processing, autonomy, machine learning and artificial intelligence. These applications require handling big data and have faced performance challenges associated with 1) memory bottleneck or 2) latency and significant power consumption associated with data transfer between computing chips. To overcome data latency and power consumption issues, innovative approaches for higher aggregate bandwidth data pathways between computing chips are needed with lower energy consumption than traditional electrical interfaces.

The International Technology Roadmap for Semiconductors (ITRS) emphasizes the importance of interconnect innovation and 3D integration, given that traditional CMOS scaling no longer satisfies computing performance requirements.

Also, the reconfigurability of the interconnect fabric, combined with reconfigurable memory, should enhance performance of network-on-chips (NoC) for computing. Current state-of-the-art (SOA) microprocessor chips rely on parallelism to boost computing performance, given the slow-down of Moore's law. For instance, Intel's 1.28 Tflop network-on-chips consist of 80 CPU tiles and consume about 90 Watts. The interchip network is running with a 10×8 2D mesh network at 4 GHz. A major issue is that charging and discharging the interconnect wires causes an increasing delay as the technology scaling advances. Low-loss photonic switching fabric can potentially enable the greatly-reduced power efficiency to an aggressive goal of below 1 pJ/bit in optical interconnect link which would enable parallelism of scaled multi-core NoC for high-performance computing.

A prior switch that had dielectric silicon nitride input and output waveguides located in different planes uses a polysilicon electro-optic material to control the coupling of light between those input and output waveguides is described in an article by Biberman et al. entitled "CMOS-Compatible Scalable Photonic Switch Architecture Using 3D-Integrated Deposited Silicon Materials for High-Performance Data Center Networks", *Proceedings* 2011 *Conference on Lasers and Electro-Optics paper OMM2*, the disclosure of which is hereby incorporated herein by reference. See FIG. 1 which is from that article. Since the electro-optically produced change in the refractive index of the silicon material is small, that silicon is formed into a ring resonator to enhance the effect of that index change. Thus, the optical spectral width over which this switch operates is fairly small.

A prior art switch that uses the phase change in a PCM to control the switching is described in an article by Zhang et al. (*Optics Letters, v.* 43, n. 1, Jan. 2018, pp. 94-97), the disclosure of which is hereby incorporated herein by reference. See FIG. 2. However, its input and output waveguides are located in the same plane rather than in two different planes. Also, R. Soref et al., published a concept of electro-optical switching at 1550 nm using a two-state GeSe phase-change layer (see *Opt. Express*, vol. 23, p. 1536-1546, 2015), the disclosure of which is hereby incorporated herein by reference. However, the device is an optical switch with a single Si waveguide embedded with GeSe PCM layer and it is not a directional coupler.

PCM materials have also been proposed for use in memory devices. See Wong et al., "Phase Change Memory", *Proceeding of the IEEE*, Vol. 98, No. 12, December 2010 pp 2201-2227, the disclosure of which is hereby incorporated herein by reference.

The technology disclosed herein is related to and an improvement over that disclosed by U.S. Pat. No. 9,368,720 which issued on 14 Jun. 2016 in that it provides a better layout when the disclosed switch is utilized in a crossbar switch design, for example. The disclosure of U.S. Pat. No. 9,368,720 is hereby incorporated herein by reference.

The disclosed switch is intended to switch 1550 nm wavelength light commonly used in optical communication systems using an optical phase change material (abbreviated as "O-PCM" or just "PCM" herein and the accompanying figures) to effect the switching. Other materials than those disclosed herein might well be used with switches intended to switch light at other wavelengths.

BRIEF DESCRIPTION OF THE INVENTION

In one aspect the presently disclosed technology provides an optical coupler (or switch) structure, where a vertical coupler has both a lower and an upper SiN waveguide that has very low-loss (preferably 0.1 dB/cm), with a very thin O-PCM material being disposed in between to control the coupler switch. The O-PCM is preferably a GeSe alloy with an optical bandgap of greater than 1 eV. Two control electrodes are connected via a thermal shunt to provide an efficient transient heating without interfering with the optical field. The switch may be fabricated with a process that is monolithic without a need for conventional wafer bonding techniques. By vertically separating the two silicon nitride waveguides, optical losses are significantly reduced as compared to a planar geometry where the two silicon nitride waveguides must intersect. The disclosed O-PCM switch, having multi-level, low-loss SiN waveguides, enables a highly flexible crossbar architecture with a reduced number of waveguide crossings compared to a planar O-PCM switch-based directional coupler array.

In another aspect the presently disclosed technology provides a vertical coupler switch comprising a lower and an upper SiN waveguide, integrated with an O-PCM material disposed in a third waveguide between the lower and upper waveguides to control optical coupling between the lower and upper waveguides.

In yet another aspect the presently disclosed technology provides a vertical directional coupler or switch comprising a lower and an upper waveguide, integrated with an optical phase change material disposed in a third waveguide disposed between the lower and upper waveguides to control optical coupling between the lower and upper waveguides. The lower and upper waveguides are preferably formed of SiN while the optical phase change material is preferably formed of GeSe or an alloy of GeSe.

In still yet another aspect the presently disclosed technology provides a cross bar switch comprising a plurality of vertical couplers or switches, the cross bar switch further comprising a plurality of input and output waveguides, the plurality of input and the plurality of output waveguides being disposed in a grid-like pattern crossing over each other in different layers of the cross bar switch, the plurality of vertical couplers or switches being disposed at the crossings of the plurality of input and output waveguides, wherein (i) upper waveguides of a subset of the vertical directional couplers or switches are coupled in series with each other and with a selected one of the input or output waveguides of the cross bar switch, (ii) lower waveguides of a different subset of the vertical directional couplers or switches are coupled in series with each other and with a different selected one of the input or output waveguides of the cross bar switch and (iii) an optical phase change material is disposed in another waveguide between the lower and upper waveguides to control optical coupling between the lower and upper waveguides in each of the plurality of vertical couplers or switches.

DETAILED DESCRIPTION

Figure 1:
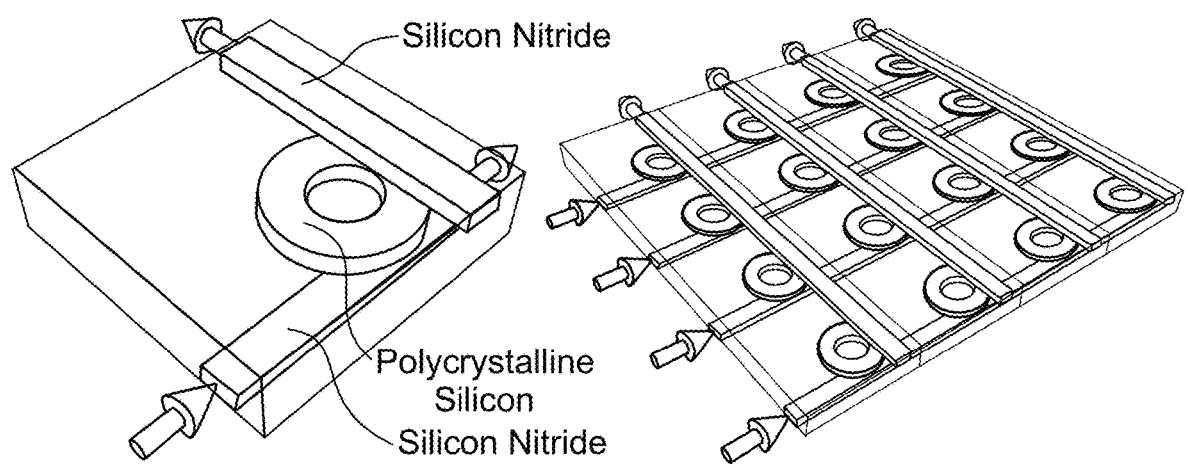
FIG. 1 depicts a prior art switch that had dielectric silicon nitride input and output waveguides located in different planes and which uses a polysilicon electro-optic material to control the coupling of light between those input and output waveguides.
Figure 2:
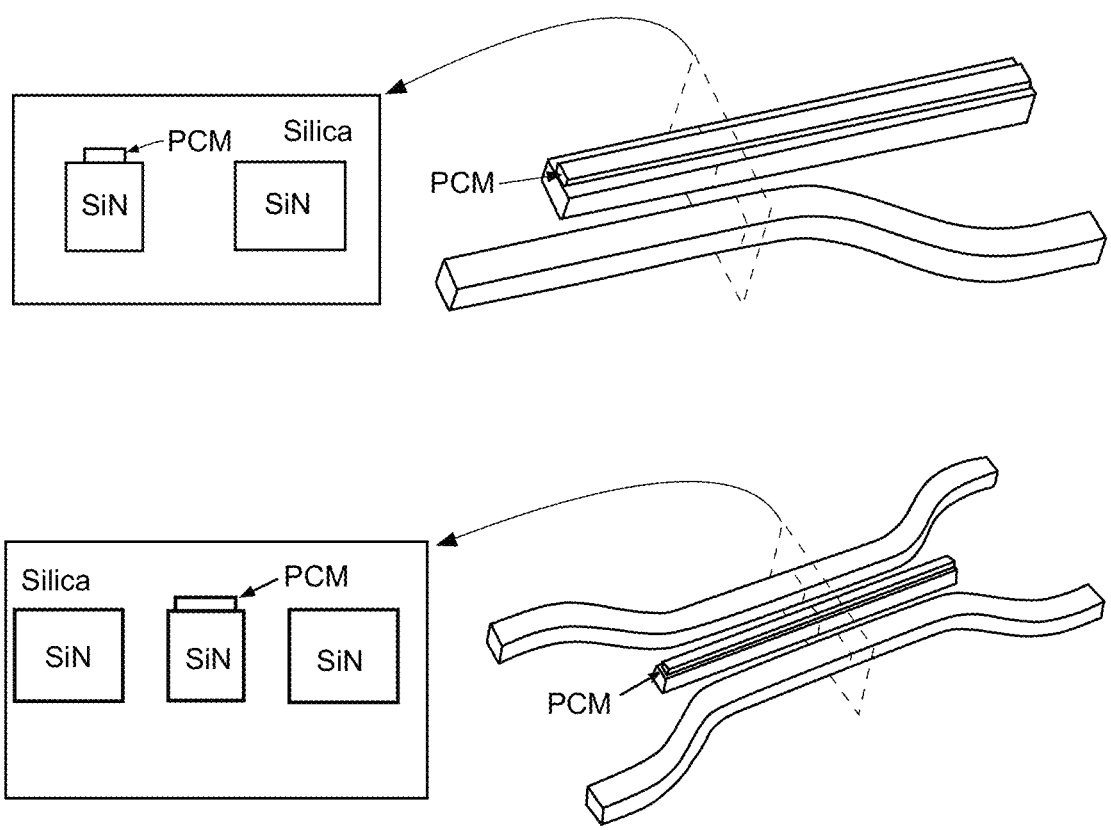
FIG. 2 depicts a prior art switch that uses the phase change in a PCM to control the switching.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to (i) all papers and documents which are filed concurrently with this specification and which are open to public inspection with this specification (the contents of all such papers and documents are incorporated herein by reference) and (ii) all papers and documents which are otherwise incorporated by reference herein (but not physically filed with this specification).

All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

As depicted by FIGS. 3(a)-3(d), the technology disclosed herein provides an coupler switch structure utilizing optical phase change materials (O-PCMs), where a vertical directional coupler switch design includes a lower waveguide (WG) 10 and an upper waveguide (WG) 12 formed of a material such as SiN that has very low-loss with O-PCM material 14 located in between to control the optical coupler switch structure 8. The state of the O-PCM material 14 is changed by heater 29. The heaters 29 are depicted as being immediately adjacent the O-PCM material 14 in FIG. 3(*a*), but it may be more convenient in certain embodiments to locate the heaters 29 further from the O-PCM material 14 whose state they control as will be seen, for example, with reference to FIG. 3(*d*). The O-PCM material 14 is preferably formed of GeSe or a GeSe alloy for reasons that are discussed below.

FIG. 3(*a*) depicts a single optical coupler switch structure 8 while FIG. 3(*c*) shows a perspective, schematic diagram of an Optical Phase Change Material (O-PCM) crossbar switch with four input (or thru in this embodiment) waveguides (In1-In4) 10 and four output (or cross in this embodiment) waveguides (Out1-Out4) 12 that are connected via sixteen optical coupler switch structures 8 each of which is depicted in greater detail by FIG. 3(*a*). The number of optical coupler switch structures 8 used in a crossbar arrangement may, of course, be far greater than the sixteen depicted in FIG. 3(*c*) since typically a crossbar switch would have more than four inputs and more than four outputs.

The control (heating or not) of the various heater 29 is accomplished from circuits in, for example, an Application Specific Integrated Circuit (ASIC) 28 and the array of optical coupler switch structures 8 forming the crossbar switch of FIG. 3(*c*) may be disposed on ASIC 28. The ASIC 28 may be conveniently formed of CMOS devices, but other or additional semiconductor technologies may be used instead of (or in addition to) CMOS, if so desired.

The input (or thru) waveguides 10 and the output (or cross) waveguides 12 may be interchanged if desired in crossbar switch of FIG. 3(*c*) whereby its input waveguides (In1-In4) would then become outputs and its output waveguides (Out1-Out4) would become inputs. The upper and lower waveguides may also be interchanged if desired.

FIG. 3(*d*) is a cross sectional schematic view of the single optical coupler switch structure 8 depicted in FIG. 3(*a*).

The inter-waveguide gap dimensions are preferably finely-controlled by nm scale material deposition processes, which greatly reduce the process variability in switch fabrication compared to a 2D lateral switch design where the gaps are defined by lithography and etching processes.

By vertically separating the upper waveguide 12 (the thru waveguide in the embodiment of FIG. 3(*c*)) and lower waveguide 10 (the cross waveguide in the embodiment of FIG. 3(*c*)), thru-state losses are signficantly reduced as compared to a planar geometry where cross and thru waveguides intersect. This 3D O-PCM switch structure 8 with multi-level, low-loss waveguides 10, 12, preferably each formed of SiN, enables a highly flexible crossbar architecture (as depicted by FIG. 3(*c*), for example) with a reduced number of waveguide crossings and thus greatly reduces the optical loss in the crossbar switch matrix. The waveguide crossings occur in a region 15 where the upper waveguides 12 first bend to run parallel to the lower waveguides 10 over a short linear segment or portion 12S of each upper waveguide 12 where it is disposed parallel to the underlying lower waveguide 10 for a distance corresponding to the length segment 12S before bending back (see non-linear potions 12NL) to lie in a direction again more or less orthogonal to the directions of the thru waveguides 10. The input and output waveguides have a finite light coupling length or region 15 (having a length of 20-30 µm, for example) to couple the light via the O-PCM switch structure disposed between them. The coupling length is desirously set by the effective light coupling with a minimal optical loss in the O-PCM switch structure.

A relatively short third waveguide 19, preferably formed mostly of SiN, is preferably disposed between the upper and lower waveguides while they are disposed parallel to each other, so the length of short third waveguide 19 preferably approximately equals the length of the straight segment 12S of waveguide 12. The short third waveguide 19 has the O-PCM material 14 sandwiched between upper and lower portions 18 (preferably formed of SiN) of short or PCM waveguide 19 and preferably midway between upper and lower surfaces of short or PCM waveguide 19. Each waveguide 19 is disposed parallel to waveguide 10 and also parallel to the short segment 12S of waveguide 12 at each 3D O-PCM switch structure 8. The length of segment 12S is preferably shorter than the spacing between adjacent waveguides 10 (which spacing is preferably about 50 µm as shown on FIG. 3(*c*)). The short-section waveguide 19 is a switchable waveguide to couple the adjacent input and output waveguides 10, 12S. Depending on the phases (amorphous or crystalline) of the PCM selected, the optical property of SiN/PCM/SiN (for example) short waveguide 19 is changed so that the coupling is normally on with the amorphous PCM switch or normally off with the crystalline PCM switch.

The heaters 29 may be located immediately adjacent the O-PCM material 14 as shown by the embodiments of FIGS. 3(*a*) and 3(*c*), or the heaters 29 may be located further away as shown by the embodiments of FIGS. 3(*d*) and 3(*e*) where the heaters 29 spaced from the PCM by a distance d and heat is communicated to (or from) regions immediately adjacent the O-PCM 14 by thermal shunt channels 16. Thermal shunt channels 16 are preferably of a material which is an efficient conductor of thermal energy such as AlN, SiC or diamond that is transparent at the frequency of the light in waveguides 10 and 12 (preferably transparent at a wavelength of 1550 nm for these communication system embodiments). The heaters 29 are preferably spaced by the distance of at least d from the O-PCM 14 to help minimize interference with the optical field in the waveguide 19. A metal heating element 29*e* is depicted within heaters 29 in FIG. 5.

The lower waveguide 10 may be embedded in a $SiO_2$ cladding material 20 having an overall thickness, for example, of about 1 µm. The cladding material 20 may be disposed directly on ASIC 28 and the lower waveguide 10 may have a thickness of about a quarter wavelength or thicker. Between the lower surface of the short waveguide 19 and an upper surface of the lower waveguide 10 is $SiO_2$ cladding material 22 having, for example, a thickness of about 0.3 µm, thereby spacing the lower surface of the short waveguide 19 and the upper surface of the lower waveguide 10 by the thickness of the $SiO_2$ cladding material 22. The short waveguide 19 (comprised of upper and lower waveguide portions 18 and the O-PCM material 14 sandwiched there between) has an overall thickness, for example, of about 1100 nm, as is explained below.

$SiO_2$ cladding material 24 is formed over the short waveguide 19 and covers the top surface of short waveguide 19 by a thickness of approximately 0.3 µm of material thereby spacing the upper surface of the short waveguide 19 and the lower surface of the upper waveguide 12 by the thickness (0.3 µm) of the $SiO_2$ cladding material 24 covering the upper surface of the short waveguide 19. The cladding materials 20 and 22 as they occur between waveguides 10, 12 and the short waveguide 19 each have thicknesses in those regions preferably of about 0.3 μm. The upper waveguide 10 may have a thickness of about a quarter wavelength or thicker.

The short waveguide 19 has a length selected to provide enough light coupling between the segment of upper waveguide 12 and the lower waveguide 10, where they parallel each other, for switching the light between its cross-state and its thru-state (described below). If the short waveguide 19 is sufficiently long, the SiN portions 18 of waveguide 19 may be omitted or reduced and then waveguide 19 may comprise solely or mostly O-PCM material 14. Preferably the O-PCM material 14 has a thickness of about 100 nm while the SiN portions 18 of waveguide 19 are each preferably about 500 nm in thickness. The O-PCM material 14 preferably has a width of about 500 nm while the SiN layers 18 may be slightly wider than the O-PCM material 18 with a width of preferably about 700 nm. Alternatively, the O-PCM material 14 and the SiN layers 18 may be of the same widths. The aforementioned dimensions are for one embodiment of the disclosed switch that is intended to switch 1550 nm wavelength light commonly used in optical communication systems.

The upper waveguide 12 (including its segment 12S) is then covered by a top cladding layer of $SiO_2$ which may have a thickness of about 10 μm. The widths of the lower, short and upper waveguides are preferably the same or about 700 nm.

These dimensions and the materials set forth in the preceding paragraphs may be changed as deemed useful be those skilled in the art, particularly for embodiments of the disclosed switch switching other wavelengths of light.

Figure 3A:
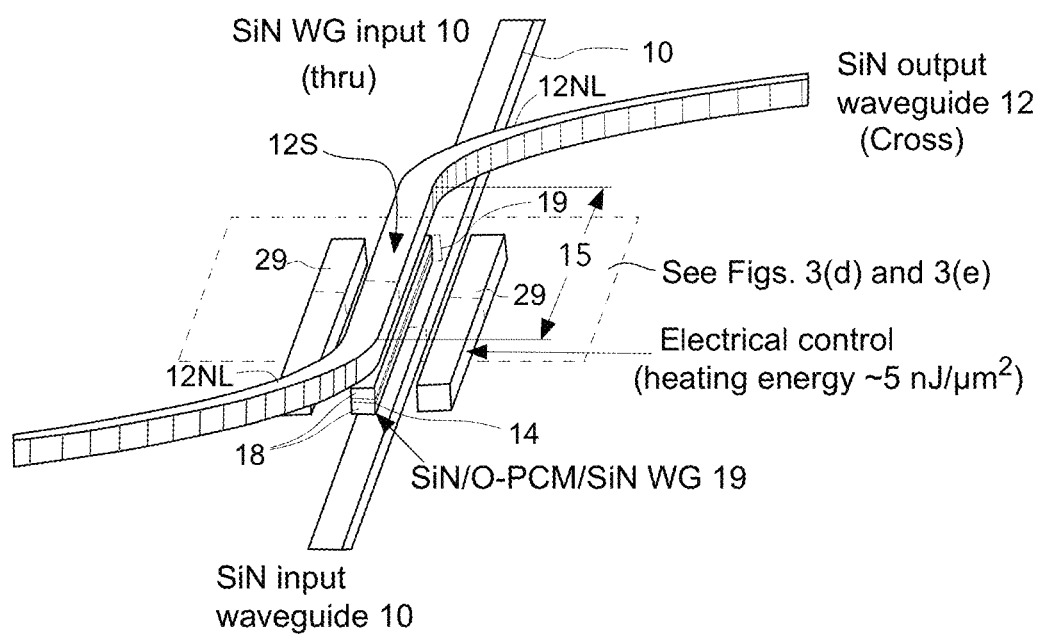
FIG. 3(a) provides a perspective view of an individual 3D O-PCM switch device (preferably used in sixteen places in the four by four crossbar switch of FIG. 3(c)). The individual 3D O-PCM switch device has low-loss SiN input waveguide and output waveguide located on different layers of the 3D structure and an O-PCM switch structure located between the two SiN waveguides.
Figure 3B:
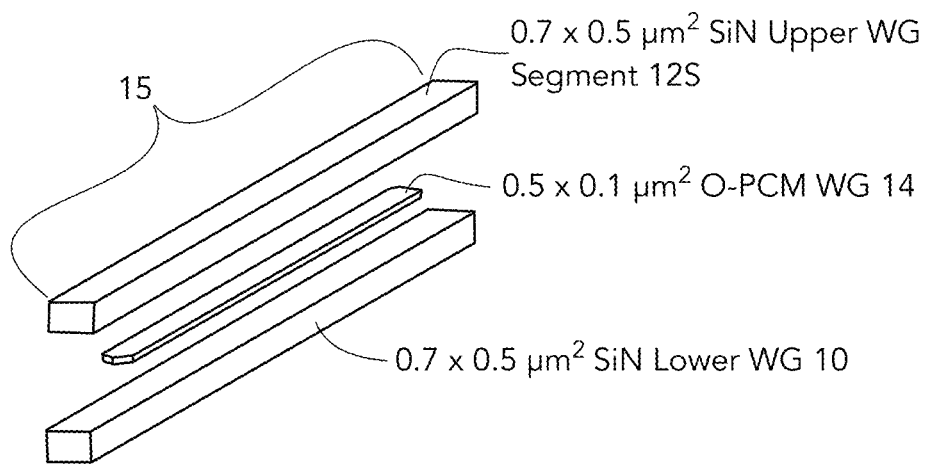
FIG. 3(b) is an exploded view of the SiN input waveguide and output waveguide located on different layers of the structure with an O-PCM switch structure located between the two SiN input and output waveguides. The SiN material in which the PCM material is embedded (in a preferred embodiment) is omitted for clarity of representation.
Figure 3C:
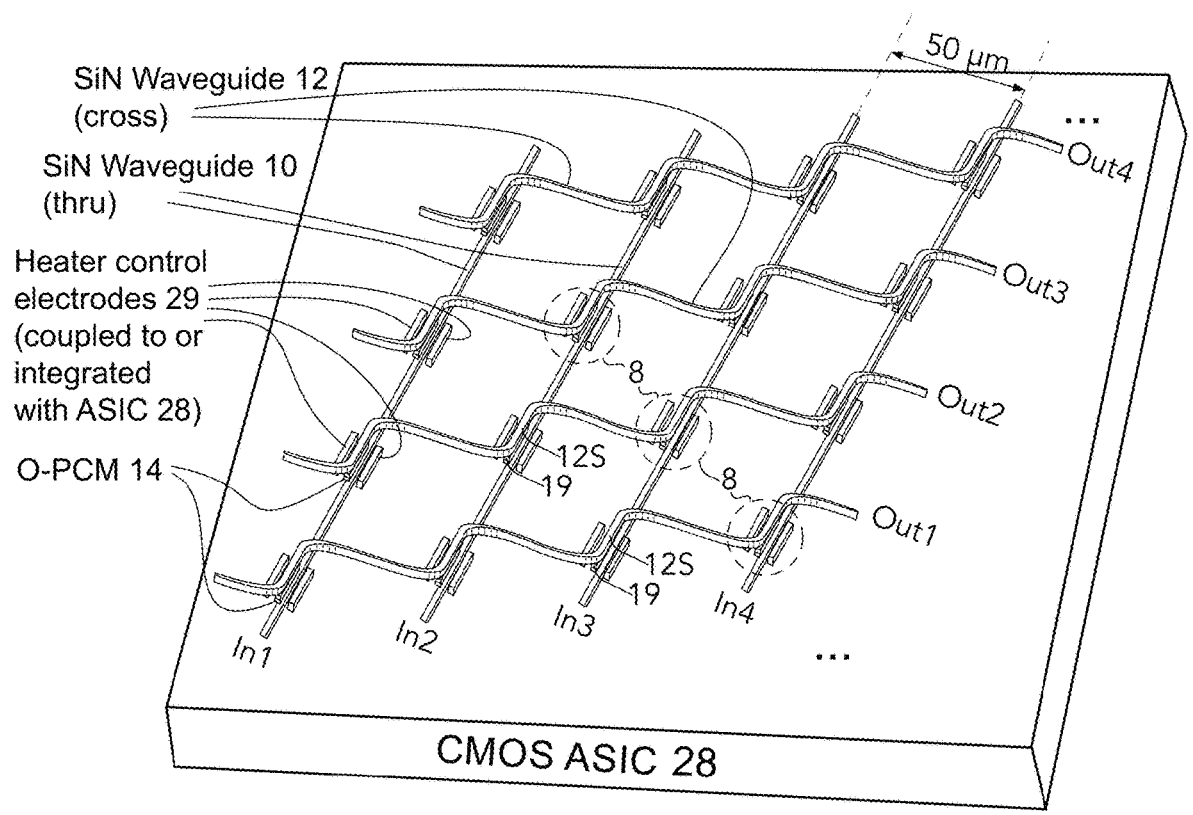
FIG. 3(c) is a perspective, schematic diagram of an Optical Phase Change Material (O-PCM or just PCM) crossbar switch with four input waveguides and four output waveguides in this embodiment.
Figure 3D:
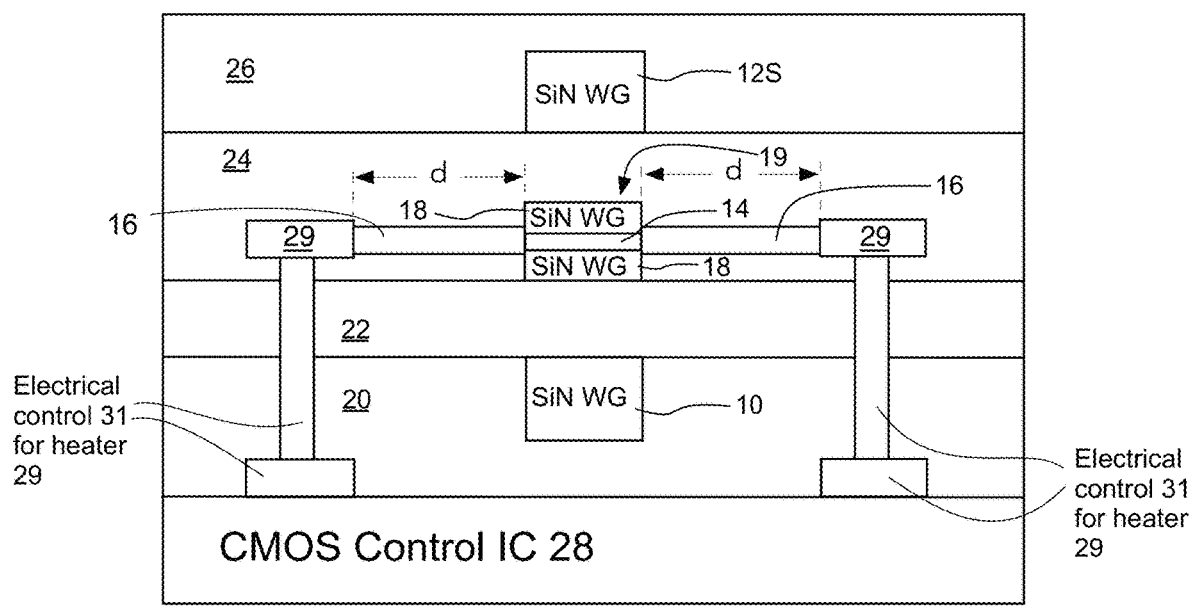
FIG. 3(d) depicts a cross-sectional view of an O-PCM switch of FIG. 3(c) showing the relative locations of the SiN waveguides, the PCM switch, heaters and thermal shunts embedded in $SiO_2$.
Figure 3E:
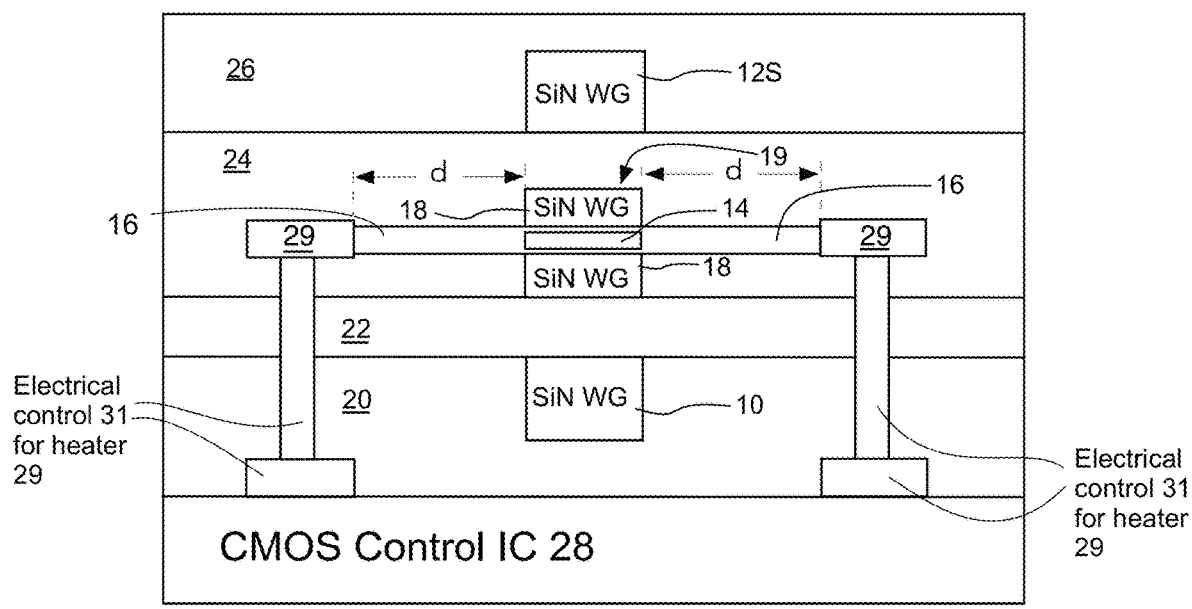
FIG. 3(e) depicts a cross-sectional view of another embodiment of an O-PCM switch similar to that of FIGS. 3(c) and 3(d) showing the relative locations of the SiN waveguides, the PCM switch, heaters and thermal shunts, but in this embodiment the thermal shunt surrounds the PCM within the PCM switch.

The embodiment of FIG. 3(e) is similar to that of FIG. 3(d), but in this embodiment the thermal shunt 16 surrounds the PCM 14 within the short PCM waveguide 19 and thus the SiN portions 18 of the short or PCM waveguide abut the thermal shunt 16 surrounding the PCM 14. This embodiment likely has better thermal characteristics that does the embodiment of FIG. 3(d), but poorer optical characteristics due to the presence of some thermal shunt material 16 between the PCM 14 and the SiN portions 18 of the short or PCM waveguide 19.

The O-PCM material 14 changes state when heated by one or more electrically controlled heaters 29 which may be thermally coupled to the O-PCM material 14 by one or more thermal shunts 16, preferably formed of AlN, for example, unless the electrically controlled heaters 29 are disposed sufficiently close to the O-PCM material 14 that thermal shunts may be omitted. But if the electrically controlled heaters 29 are disposed closer than distance d (a half wavelength at 1550 nm) depicted in FIGS. 3(d) and 3(e), then the heaters 29 should then be of a design that keeps them from interfering with the optical field in short waveguide 19.

The switch 8 operation will now be explained with reference to FIGS. 4(a)-(c). When the O-PCM material 14 is crystalline (see FIG. 4(b)), the input light remains in the lower (the thru-state) SiN waveguide 10. When the O-PCM material 14 is heated to become amorphous (see FIG. 4(c)), the input light is coupled from the lower waveguide 10 into the upper waveguide 12 (the cross-state). The O-PCM material 14 is preferably disposed in the short waveguide 18 and is preferably 0.5 μm wide, 0.1 μm high and 30 μm long, and is separated from SiN waveguides 10, 12 by distances of approximately 0.5 μm, which it may be noted is preferably less than the half wavelength distance d.

Figure 4A:
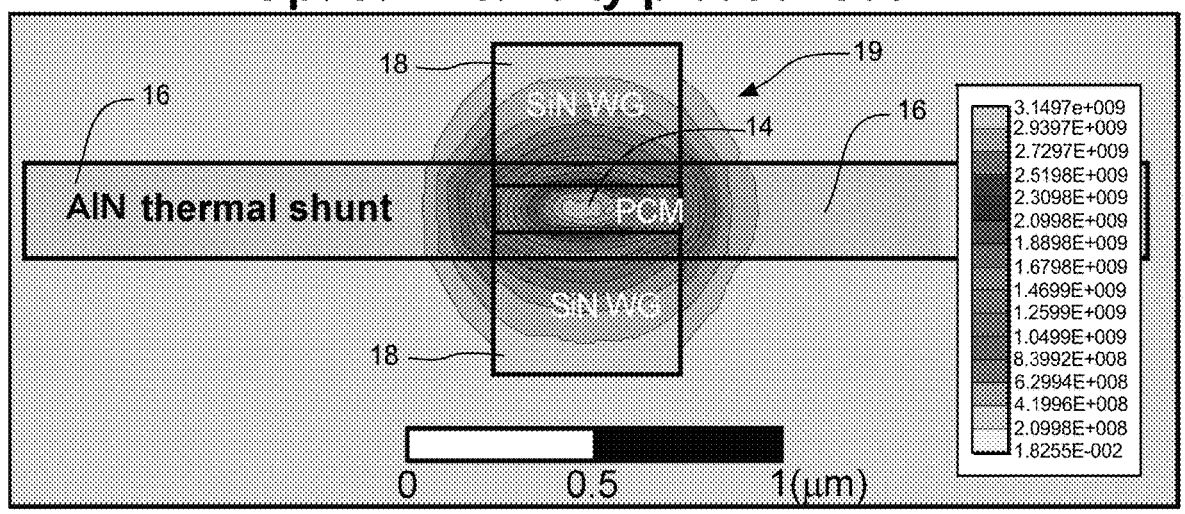
FIG. 4(a) shows a HFSS simulation of the disclosed O-PCM based 3D bidirectional coupler switch, where O-PCM material is integrated preferably in the middle or short waveguide which is disposed between the upper and lower waveguides. The table in this figure lists simulated optical intensities in the waveguide in regions adjacent the middle or short waveguide expressed in arbitrary units of power per unit area.
Figure 4B:
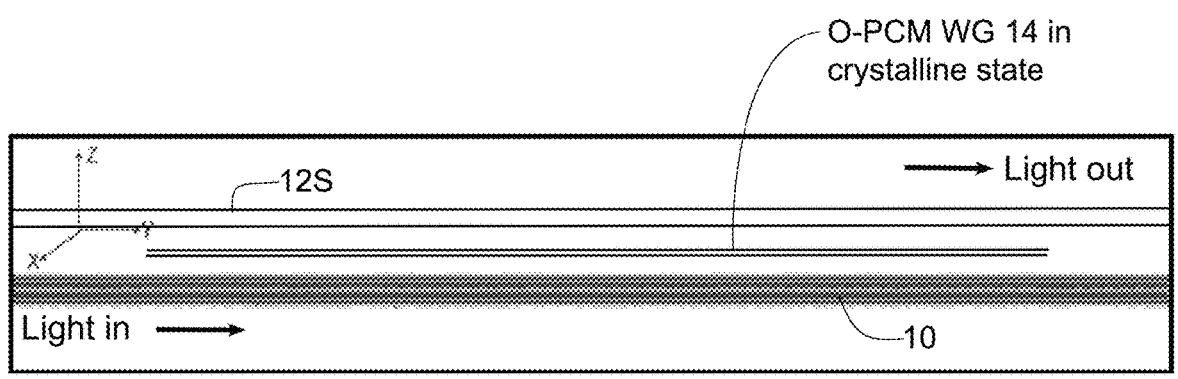
FIGS. 4(b)-(c) depict, depending on the phase of O-PCM material, that the light will couple out of the bottom waveguide and into the upper waveguide (a "cross" configuration or state) or remain in the bottom waveguide (a "thru" configuration or state).
Figure 4C:
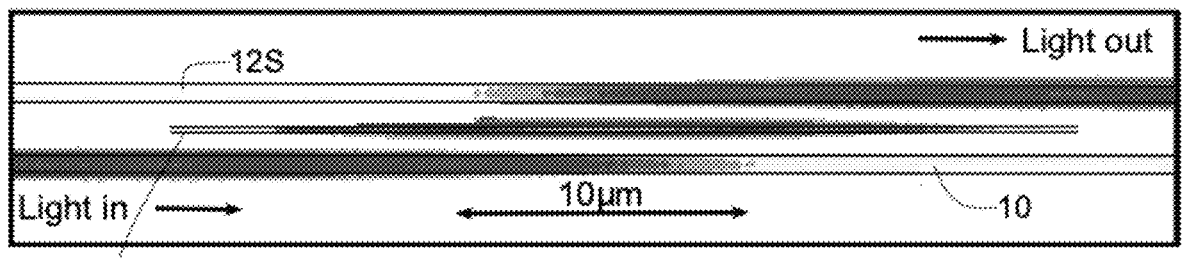

The PCM material 14 may be transiently changed between its crystalline (see FIG. 4(b)) and amorphous (see FIG. 4(c)) states by applying suitable electrical pulses (set and reset) to heaters 29 via electrical connections 31 from IC 28. When the heaters 29 receive a relatively large amount of peak energy over a relatively short period of time they reset the PCM material 14 to its amorphous (see FIG. 4(c)) state. Conversely, when the heaters 29 receive a relatively lower amount of peak energy over a relatively longer period of time they set the PCM material 14 to its crystalline (see FIG. 4(b)) state. See Wong et al., "Phase Change Memory", *Proceeding of the IEEE*, Vol. 98, No. 12, Dec. 2010 pp 2201-2227, the disclosure of which is hereby incorporated herein by reference, for a more detailed discussion of this phenomenon.

As can be seen from FIGS. 4(a)-(c), the coupling between waveguides is quite efficient . . . essentially all of the light in the lower waveguide 12 couples into the upper waveguide 10 when structure 8 is in its cross state (see 4(c)) due to the O-PCM WG material 14 being in its amorphous (heated) state. This is due to the fact that the 3D vertical directional coupler 8 includes vertically-aligned, waveguides 10, 12 and 19 are located in a close proximity to each other and are disposed parallel to each other for the length of the short waveguide 19, so they provide an efficient coupling compared to traditional the lateral directional couplers.

Additionally, it should now be apparent that light could enter either end of the disclosed coupler and thus exit the other end. The disclosed coupler can operate bidirectionally. Furthermore, it should further be apparent that light could enter either waveguide 10 or 12 and exit the other one of waveguides 10 and 12 when the O-PCM material 14 is in its amorphous state (and thus the disclosed coupler is then in its cross-state) or remain in that waveguide when the O-PCM material 14 is in its crystalline state (and thus the disclosed coupler is then in its thru-state).

The waveguides 10 and 12 and portions 18 of waveguide 19 are preferably formed of SiN since SiN waveguides are known for their low optical losses at the 1550 nm wavelength light commonly used in optical communication systems. Other waveguide materials can be used but with possibly a greater optical loss. GeSe is preferably selected for the O-PCM material 14 since has enough optical bandgap (1-2 eV) to minimize the optical loss at the aforementioned 1550 nm wavelength, compared to other O-PCM materials such as GeTe.

Figure 5:
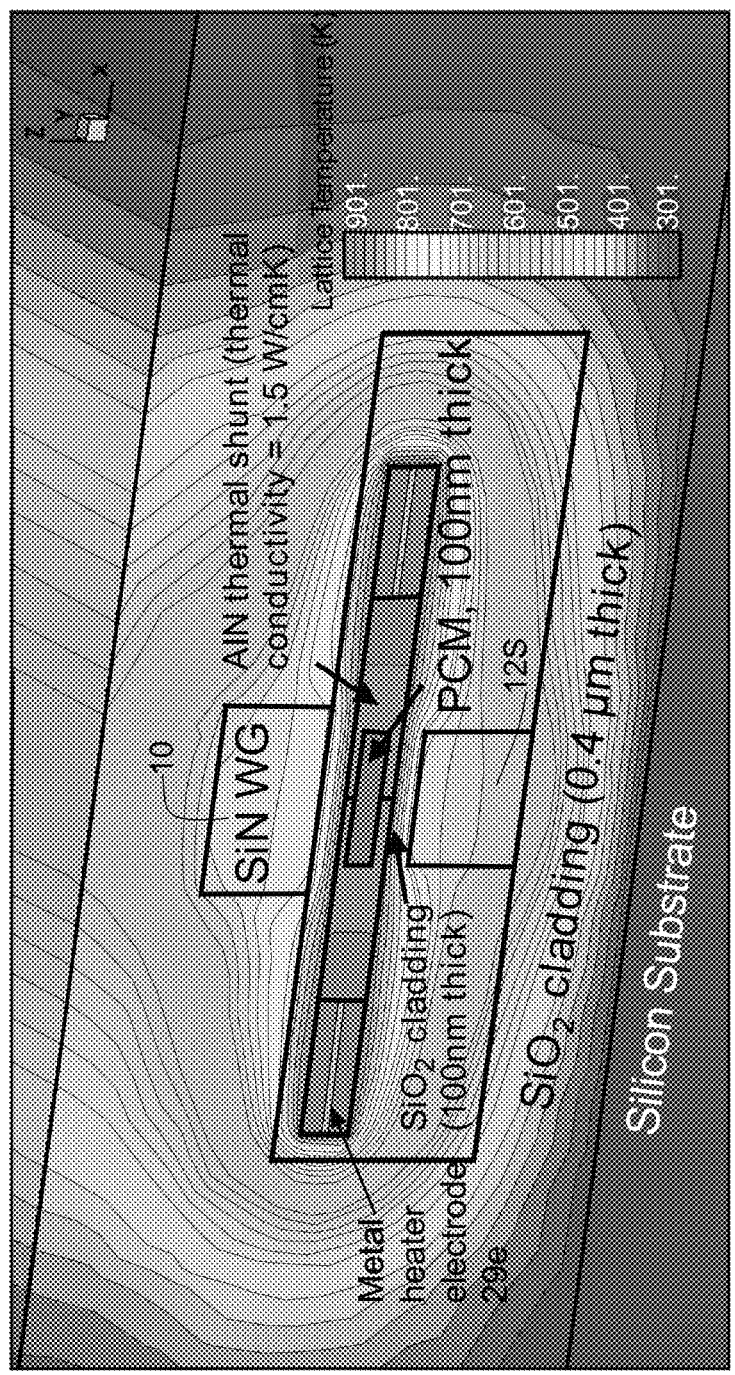
FIG. 5 shows the O-PCM switch with a thermal shunt delivering the desired heat transfer efficiently to the O-PCM layer. The thermal modeling of the transient heating of the PCM is at 5 $nJ/\mu m^2$. The SiN material of the short waveguide that is utilized with the PCM is omitted for the sake of clarity of representation.

FIG. 5 shows the presently disclosed invention of control electrode coupling to 3D optical switch design disclosed herein. To construct electrically-programmable 3D O-PCM switches 8 with low optical loss due to the metal heaters 29, we desirously locate the heaters 29 at a distance d of at least a half wavelength away (preferably 0.7 μm (a half wavelength at 1550 nm)). Furthermore, to achieve improved thermal coupling between the heater grids and the O-PCM waveguides, we take advantage our prior AlN thermal shunt technology disclosed in U.S. Pat. No. 9,368,720, the disclosure of which is hereby incorporated herein by this reference. The high (1.5 W/(cm*K)) thermal conductivity AlN layer is a dielectric thermal shunt with an optical refractive index of 2.02+j0.00002, which is close to that of the SiN waveguides. AN provides a desirable optical index close to that of SiN and has a desirable thermal conductivity allowing it to act as a thermal shunt 16. A simulation of the optical mode in the 3D thermally-shunted O-PCM switch shows that the optical mode is well-confined as shown in FIG. 4(a). FIG. 5 shows a transient thermal modeling for an applied 0.5-μsec electrical pulse with 8 mW/μm$^2$, and verified that the heat is well-confined within the O-PCM material 14 and the switching energy is sufficient to produce electro-thermal cycles shorter than a few μsec, including both the heating and the cooling steps.

The switch disclosed herein utilizes benefit of an optical coupler structure, where the vertical directional coupler switch design has both a lower and an upper SiN waveguide 12, 10 that has very low-loss (preferably 0.1 dB/cm), with a very thin O-PCM material 14 being disposed in between to control the directional coupler switch 8. The O-PCM material 14 is preferably GeSe or a GeSe alloy preferably with an optical bandgap of greater than 1 eV. Control electrodes 31 may be provided a channel from CMOS IC 28 to provide electrical energy to heaters 29 and to conduct heat back to the CMOS IC 28 when the heaters are not energized, electrodes 29 in provide efficient transient heating (by providing electrical pulses to heaters 29) and transient cooling of the O-PCM material 14 (by being an efficient thermal and electrical conductor, such as Cu) without interfering with the optical field(s) in waveguides 10, 12 by being spaced therefrom even further than are heaters 29.

By vertically separating the two SiN waveguides 10, 12, optical losses are significantly reduced as compared to a planar geometry where two silicon nitride waveguides must intersect. Since the O-PCM waveguide 19 is disposed between the top 10 and bottom 12 waveguides and when the O-PCM material 14 in waveguide 19 is changed to its crystalline state, its refractive index is quite different than that of waveguides 10, 12 so isolation between waveguides 10, 12 then occurs. Conversely, when the O-PCM material 14 in waveguide 19 is changed to its amorphous state, its refractive index is similar to that of waveguides 10, 12 so isolation between waveguides 10, 12 then no longer occurs and light moves from one waveguide to the other. The disclosed 3D O-PCM switch, having multi-level, low-loss SiN waveguides, enables a highly flexible crossbar architecture with a reduced number of waveguide crossings.

When the PCM is amorphous, the PCM acts as a low-loss dielectric material, not too different from the lower and upper SiN waveguides 18. The incoming light in the waveguide 10 can couple to the upper waveguide 12. In contrast, when the PCM is crystalline, the PCM becomes metallic and optically lossy. The light cannot couple to the outgoing waveguide.

The vertical separation of the SiN waveguides 10, 12 is with reference with respect to the major planes of the various layers depicted in the figures (particularly FIGS. 3(d) and 3(e)), and it should be apparent to those skilled in the art that the disclosed embodiments may be utilized or operated in any desired orientation. Thus, the term 'vertical' herein or reference thereto (and in the accompanying claims) is not intended to limit how the disclosed embodiments may be utilized or operated. Moreover, the positions of the upper and lower waveguides 12, 10 may be reversed if desired, so the upper waveguide 12 then assumes the position of the lower waveguide and the lower waveguide 10 then assumes the position of the upper waveguide.

The figures accompanying this application are presented as black and white drawings, but colored versions of FIGS. 3(a), 3(b), 3(d), 4(a)-4(c) and 5 can be found in Appendix A to this patent application. The colored version of those figures present certain information somewhat more clearly than do the black and white versions thereof, so those interested in the present technology may wish to request a color copy of Appendix A from the United States Patent and Trademark Office.

Having now described the invention in accordance with the requirements of the patent statute, those skilled in this art will understand how to make changes and modifications to the present invention to meet their specific requirements or conditions. Such changes and modifications may be made without departing from the scope and spirit of the invention as disclosed herein.

The foregoing Detailed Description of exemplary embodiments is presented for purposes of illustration and disclosure in accordance with the requirements of the patent statute. It is not intended to be exhaustive nor to limit the invention to the precise form(s) described, but only to enable others skilled in the art to understand how the invention may be suited for a particular use or implementation. The possibility of modifications and variations will now be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "comprising the step(s) of . . . ".

What is claimed is:

1. An optical coupler or switch structure, comprising two waveguides disposed in different layers of the optical coupler or switch structure and including an optical phase change material disposed between the two waveguides to control an optical coupling between the two waveguides, the optical phase change material disposed in a third waveguide disposed between the first two mentioned waveguides and wherein the first two mentioned two waveguides and said third waveguide are formed of SiN or an alloy of SiN and the optical phase change material is GeSe or a GeSe alloy with an optical bandgap of greater than 1 eV.

2. The optical coupler or switch structure of claim 1 wherein electrically controlled heaters are thermally coupled via a thermal shunt to the optical phase change material in said third waveguide to provide transient heating of the optical phase change material in response to an electrical signal applied to the heaters.

3. The optical coupler or switch structure of claim 1 wherein one of the two waveguides has a linear portion thereof that is disposed parallel to the other of the two waveguides and to said third waveguide, the one of the two waveguides having additional non-linear portions which are in light communication with said linear portion, the non-linear portions allowing the one of the two waveguides to cross over the other of the two waveguides.

4. A vertical directional coupler or switch comprising a lower and an upper waveguide, integrated with an optical phase change material disposed within another waveguide comprising mostly SiN or an alloy of SiN, said another waveguide being disposed between the lower and upper waveguides to control an optical coupling between the lower and upper waveguides.

5. The vertical directional coupler or switch according to claim 4 wherein the lower and upper waveguides are formed of SiN or an alloy of SiN.

6. The vertical directional coupler or switch according to claim 4 wherein the optical phase change material is a material with an optical bandgap of greater than 1 eV.

7. The vertical directional coupler or switch according to claim 4 wherein the optical phase change material is GeSe or an alloy of GeSe.

8. The vertical directional coupler or switch according to claim 4 further including electrically operated heaters connected to a thermal shunt for providing transient heating of the optical phase change material via said thermal shunt without interrupting an optical field in either of said lower and upper waveguides.

9. The vertical directional coupler or switch according to claim 8 wherein the optical phase change material is surrounded on four sides thereof by a portion of the thermal shunt.

10. The vertical directional coupler or switch according to claim 8 wherein the optical phase change material abuts the thermal shunt on two opposing side surfaces thereof.

11. The vertical directional coupler or switch according to claim 4 wherein the optical phase change material is disposed in said another waveguide that is disposed between predetermined portions of the upper and lower waveguides.

12. The vertical directional coupler or switch according to claim 11 wherein said another waveguide and said predetermined portions of the upper and lower waveguides are all disposed parallel to each other.

13. The vertical directional coupler or switch according to claim 4 wherein the optical phase change material is disposed within said another waveguide, said another waveguide being disposed parallel to predetermined portions of the upper and lower waveguides.

14. The vertical directional coupler or switch according to claim 4 wherein said another waveguide has a length which is substantially shorter than either of the upper and lower waveguides.

15. The vertical directional coupler or switch according to claim 4 wherein one of the two waveguides has a linear portion thereof that is disposed parallel to the other of the two waveguides, the one of the two waveguides having additional non-linear portions which are in light communication with said linear portion, the non-linear portions allowing the one of the two waveguides to cross over the other of the two waveguides.

16. A cross bar switch comprising a plurality of vertical directional couplers or switches according to claim 4, the cross bar switch further comprising a plurality of input and output waveguides, the plurality of input and output waveguides being disposed in a grid-like pattern crossing over each other in different layers of the cross bar switch, the plurality of vertical directional couplers or switches according to claim 4 being disposed such that the plurality of input and output waveguides cross over each other, wherein upper waveguides of a subset of the vertical directional couplers or switches are coupled in series with each other and with a selected one of the input or output waveguides of the cross bar switch and wherein lower waveguides of a different subset of the vertical directional couplers or switches are coupled in series with each other and with a different selected one of the input or output waveguides of the cross bar switch.

17. The optical coupler or switch structure of claim 1 wherein the third waveguide is spaced from the two waveguides by layers of $SiO_2$ material.

18. The vertical directional coupler or switch according to claim 4 wherein the another waveguide is spaced from the lower and upper waveguides by $SiO_2$ material.

\* \* \* \* \*